United States Patent [19]

Maget

[11] Patent Number: 4,648,955

[45] Date of Patent: Mar. 10, 1987

[54] PLANAR MULTI-JUNCTION ELECTROCHEMICAL CELL

[75] Inventor: Henri J. R. Maget, Los Altos, Calif.

[73] Assignee: IVAC Corporation, San Diego, Calif.

[21] Appl. No.: 724,912

[22] Filed: Apr. 19, 1985

[51] Int. Cl.[4] .................. C25B 9/04; C25B 11/00; H01M 8/10; H01M 2/00

[52] U.S. Cl. .................. 204/258; 204/265; 204/266; 204/282; 204/301; 429/30; 429/34

[58] Field of Search .............. 204/263–266, 204/282–283, 252, 295, 258, 301; 429/30

[56] References Cited

U.S. PATENT DOCUMENTS

| | | | |
|---|---|---|---|
| 3,418,168 | 12/1968 | Wentworth | 136/86 |
| 3,460,991 | 8/1969 | White | 429/30 |
| 3,497,389 | 2/1970 | Berger et al. | 204/295 X |
| 3,506,493 | 4/1970 | Eisenberg | 136/86 |
| 4,024,036 | 5/1977 | Nakamura et al. | 204/295 X |
| 4,057,479 | 11/1977 | Campbell | 204/258 |
| 4,069,128 | 1/1978 | Westerlund | 204/258 |
| 4,174,260 | 11/1979 | Schmidberger | 204/266 X |
| 4,210,501 | 7/1980 | Dempsey et al. | 204/129 |
| 4,211,628 | 7/1980 | Obata et al. | 204/283 X |
| 4,276,146 | 6/1981 | Coker et al. | 204/266 |
| 4,377,455 | 3/1983 | Kadija et al. | 204/283 X |
| 4,388,163 | 6/1983 | Richter et al. | 204/101 |
| 4,408,046 | 9/1977 | MacMullin | 204/266 |
| 4,469,577 | 9/1984 | Schmitt et al. | 204/282 X |

Primary Examiner—Donald R. Valentine
Attorney, Agent, or Firm—Fulwider Patton Rieber Lee & Utecht

[57] ABSTRACT

An improved arrangement of electrochemical cells wherein the individual cells are arranged on a single electrolytic membrane. The arrangement provides for the placement of many individual cells in one chamber, thereby eliminating the many chamber walls and inlet and outlet lines associated with the standard structure. An electrochemical device can thus be constructed very simply and, when the cells are electrically connected in series, will operate at voltages compatible with standard battery voltages or generate power at any desired voltage.

31 Claims, 6 Drawing Figures

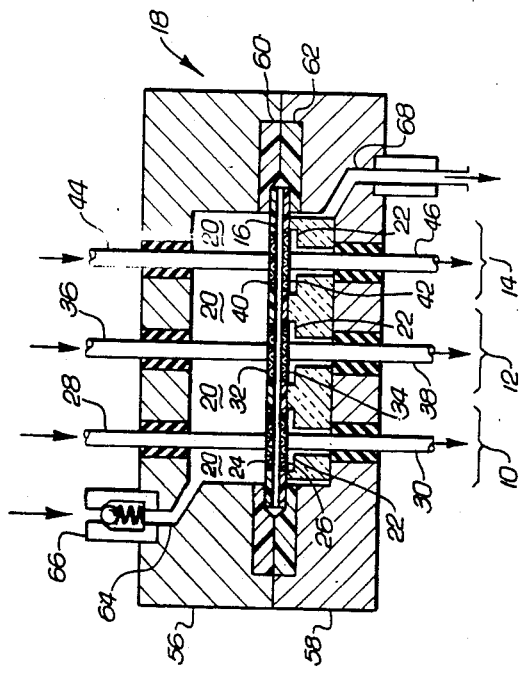

4,648,955

PLANAR MULTI-JUNCTION ELECTROCHEMICAL CELL

BACKGROUND OF THE INVENTION

This invention relates generally to electrochemical devices, and, more particularly, to the arrangement of electrochemical cells.

An electrochemical cell, which typically takes the form of an electrolytic membrane positioned between and in contact with a cathode and an anode, can either generate energy (battery) or do work (pump). When the cell is configured as a battery, a fuel gas, such as hydrogen, is supplied to the anode, and a gaseous oxidant, such as oxygen is supplied to the cathode. An electrical current is generated, while water is produced as a byproduct. U.S. Pat. No. 3,418,168 discloses such a single cell used to generate electricity. When the cell is configured as a pump, an electrical voltage is applied across the anode and cathode. A gas, one capable of entering into an oxidation/reduction reaction, is then supplied to the anode. At the anode, the gas is ionized, and the ions travel across the electrolytic membrane in response to the voltage gradient across the membrane. At the cathode, the ions are reconverted to molecules of the gas, thereby increasing the pressure on the cathode side and decreasing the pressure on the anode side. The result is a pumping action across the membrane from anode to cathode. U.S. Pat. No. 4,402,817 discloses such a single cell used as a pump.

As individual electrochemical cell, whether configured as a battery or a pump, generally operates at relatively small voltage and current levels. The small voltage prevents breakdown of the electrolytic membrane and, in addition, improves the efficiency of the cell. Although each individual cell operates at small voltage and current levels, the electrochemical device as a whole must operate at much higher voltages and currents to be compatible with standard batteries and electrical devices. Typically, the individual cells are mechanically stacked together, whereby adjacent cell walls are joined together. The cells are the electrically connected in series and/or parallel. This method is generally acceptable when large scale devices are contemplated. But in some applications, especially where small scale devices are required, this method becomes unacceptable. Therefore, there has been a need for an improved method of arranging the individual cells for these types of applications.

SUMMARY OF THE INVENTION

The present invention resides in an improved arrangement of electrochemical cells wherein the individual cells are arranged on a single electrolytic membrane and contained within one chamber, with the cells electrically connected in series and/or parallel. This arrangement eliminates the individual cell compartments and thereby considerably reduces the bulk and weight of a mechanical stacking arrangement. This improved arrangement also increases cell reliability and efficiency and reduces the cost of cell manufacture.

The significance of this structure is that the same gas flow rate can now be achieved with, for example, a three-cell arrangement on a single membrane and electrically connected in series as with a single cell, but with the voltage increased by a factor of three. The current drawn by the improved arrangement is likewise reduced by a factor of three, and therefore power consumption remains constant. The improved arrangement, with the voltage increased by a factor of three and with no change in total membrane area, is therefore compatible with a standard dry-cell battery.

A three-fold increase in voltage could be achieved by a three-cell mechanical stacking arrangement, one in which three single cells are simply joined together and electrically connected in series. Although the voltage would be increased as desired, the gas flow rate, the current level and the size would also be increased by a factor of three. This three-cell arrangement could be miniaturized by a factor of three in order to operate at a comparable gas flow rate and current level as the three-cell improved arrangement, but not without the weight, bulk and complexity of the many compartment walls and inlet and outlet lines which would result from the miniaturized mechanical stacking arrangement. Not only does the improved arrangement reduce the weight, bulk and complexity of a mechanical stacking arrangement, but with the elimination of all but one membrane and one inlet and outlet line, also increases efficiency and reliability at a much reduced cost and with a greatly simplified manufacturing process.

It will be appreciated from the foregoing that the present invention represents a significant advance in this field. Other features and advantages of the present invention will become apparent from the following detailed description, taken in conjunction with the accompanying drawings, which illustrate, by way of example, the principle of the invention.

DESCRIPTION OF THE DRAWINGS

FIG. 1 is an elevational view, partly in cross section, of a planar multi-junction cell with three cells on a single planar surface;

FIG. 2 is a diagrammatical view showing the series electrical connection of the three cells;

FIG. 3 is a graph showing the voltage-versus-current curves for examplary single and double electrochemical cells;

DESCRIPTION OF THE PREFERRED EMBODIMENT

Figure 4:
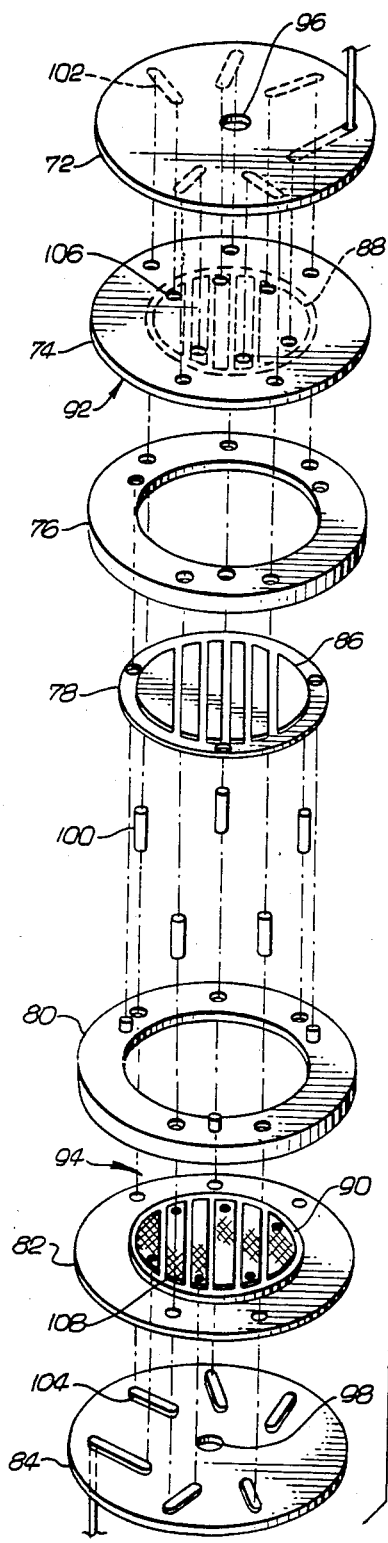
FIG. 4 is an exploded perspective view of a planar multi-junction cell with six cells on a single planar surface.

As shown in the drawings, the invention is concerned with a novel arrangement of electrochemical cells. The voltage at which a typical cell operates is much lower than that of conventional power sources, such as dry-cell batteries. Stacking cells mechanically and then connecting them electrically in series solves this voltage problem, but only at the expense of increased bulk and weight, and increased gas flow.

In accordance with the invention, multiple electrochemical cells are arranged on a single electrolytic membrane and contained within one chamber, with the cells electrically connected to provide a desired operating voltage. FIG. 1 illustrates an arrangement of three electrochemical cells 10, 12 and 14 on a single electrolytic membrane 16, configured for a pump application. A gas-tight container 18 forms a pump chamber. The electrolytic membrane 16 separates the pump chamber into an inlet chamber 20 and an outlet chamber 22. Upon application of a voltage across the membrane 16, an electrochemically active fluid contained in the inlet chamber 20 is pumped into the outlet chamber 22. Membrane 16 also forms the structural foundation for the three electrochemical cells 10, 12 and 14.

The electrochemical cells 10, 12 and 14 are each comprised of a pair of conductive electrodes disposed on opposite surfaces of the electrolytic membrane 16, a pair of electrical contacts for electrically connecting the electrodes of the cells together and that portion of membrane 16 in contact with the electrodes. For example, electrochemical cell 10 includes electrodes 24 and 26, electrical contacts 28 and 30 and membrane 16. Electrochemical cell 12 includes electrodes 32 and 34, electrical contacts 36 and 38 and membrane 16. Electrochemical cell 14 includes electrodes 40 and 42, electrical contacts 44 and 46 and membrane 16.

The electrodes can be constructed of any material that is electrically conductive and acts as a catalyst in converting the gas molecules in the inlet chamber 20 ions and reconverting those ions to gas molecules in the outlet chamber 22, in respone to a voltage gradient applied across membrane 16. The membrane 16 can be composed of any solid-electrolyte material containing dissociated functional groups capable of transporting either cations or anions. The electrical contacts can be any conductive material.

The electrochemical pump shown in FIG. 1 is easily constructed. The gas-tight container 18 is formed by wall segments 56 and 58. Segments 56 and 58 may be composed of any material impervious to gas, such as metal, glass or plastic. Gaskets 60 and 62 ensure gas-tight operation when the segments 56 and 58 are connected to form the container 18. The segment 56 includes a gas inlet 64 and a check valve 66 leading to the inlet chamber 20. The segment 58 includes a gas outlet 68 leading from the outlet chamber 22.

The electrical contacts 28, 30, 36, 38, 44 and 46 extend through the container 18, where the contacts are electrically connected. FIG. 2 shows an electrical connection of the three electrochemical cells in a series arrangement. The electrical contact 28 is connected to the positive side of a suitable power source, the electrical contacts 30 and 36 are electrically connected and the electrical contacts 38 and 44 are electrically connected and the electrical contact 46 is connected to the negative side of the power source. The electrical connection of the contacts in this manner increases the voltage of the device by a factor of three over the voltage of the individual cells.

The device shown in FIG. 1 operates with any reduction/oxidation material that is electrochemically reversibly active so as to react at the electrodes 24, 32 and 40 to produce ions, which will then migrate across electrolytic membrane 16 and be reconverted at the electrodes 26, 34 and 42 into a molecular state. Molecular hydrogen in gaseous form is one suitable example. At the electrodes 24, 32 and 40 an anodic reaction occurs, represented by the equation:

$$H_2 \rightarrow 2H^+ + 2e^-$$

The hydrogen molecules in the inlet chamber 20 are therefore converted into ions which move across the electrolytic membrane 16 becuase of the voltage gradient across the membrane. At the electrodes 26, 34 and 42, a cathodic reaction occurs, represented by the equation:

$$2H^+ + 2e^- \rightarrow H_2$$

The hydrogen ions are therefore reconverted into hydrogen molecules and released into the outlet chamber 22.

In a series arrangement of electrochemical cells on a single membrane, the total voltage of the device should equal the sum of the individual cell voltages, provided there is no "cross-talk" or ionic-electrolytic leakage between the cells. FIG. 3 shows exemplary experimental results obtained with two single cells and one double cell. Voltage, in volts, is shown on the vertical axis and current, in milliamps, is shown on the horizontal axis. First, each of the single cell currents is shown as a function of the voltage. These voltage-current curves are then added to arrive at the calculated sum curve, which should equal the experimental results of two cells in series. The two curves are similar and therefore "cross-talk" is small. This result is due in large part to a high ratio of the distance between adjacent electrodes and the thickness of the electrolytic membrane.

Figure 6:
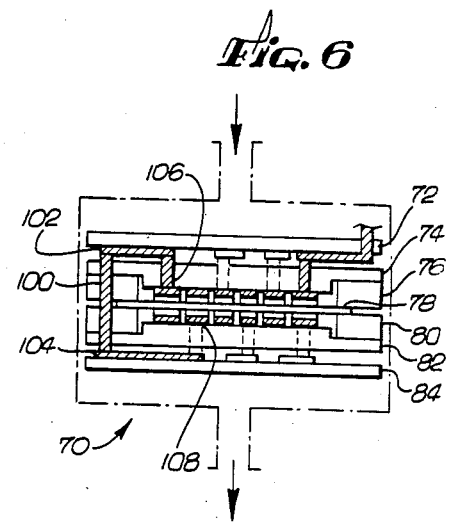
FIG. 6 is a sectional view taken substantially along the line 6—6 in FIG. 5.
Figure 5:
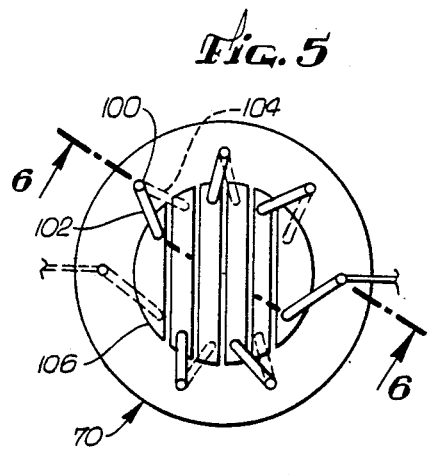
FIG. 5 is a plan view of the planar multi-junction electrochemical cell of FIG. 4.

FIGS. 4, 5 and 6 illustrate the simplicity of construction of an electrochemical pump having six electrochemical cells on a single electrolytic membrane. A modular electrochemical pump 70 is constructed of seven circular segments, indicated by reference numerals 72, 74, 76, 78, 80, 82 and 84. The middle segment 78 includes a solid electrolytic membrane. Deposited on both sides of the membrane of segment 78 is an electrode formation 86. The two ring-shaped segments 76 and 80 provide structural support for the membrane of segment 78. The next outer segments 74 and 82, also ring-shaped, have current collectors 88 and 90 and form an inlet chamber 92 and an outlet chamber 94. The outer segments 72 and 84 form the top and bottom walls of the pump 70. Fluid enters the inlet chamber 92 through a fluid inlet 96 included in segment 72. A voltage gradient across the membrane of segment 78 causes the electrochemically active fluid in the inlet chamber 92 to be pumped across the membrane into the outlet chamber 94. The outlet chamber leads to a fluid outlet 98, included in segment 84.

The six electrochemical cells, which are formed by the combination of segments 74, 78 and 82, each includes conductive electrodes and that portion of the membrane of segment 78 in contact with the electrodes. The electrolytic membrane of segment 78 provides the foundation upon which each of the six cells is built. A thin film of metal is deposited on both sides of the membrane of segment 78, in the desired shape of the electrodes, to form the electrode formation 86. The electrode formation 86, of the preferred embodiment, has six essentially parallel strips of metal film, each having approximately the same surface area. The current collectors 88 and 90 overly the electrode formation 86. The current collectors of the six electrochemical cells are electrically connected internally through a series of contact pins, which are inserted through holes in the outer perimeter of the segments, and metal traces deposited directly on the inner face of the outer segments 72 and 84. For example, contact pin 100 provides electrical contact between metal trace 102 and metal trace 104. In turn, metal trace 102 is in electrical contact with a current collector 106 and metal trace 104 is in electrical contact with a current collector 108. The contact pins also provide alignment and structural integrity when the segments are combined.

From the foregoing, it will be appreciated that the arrangement of cells on a single electrolytic membrane of the present invention allows for a very efficient and compact electrochemical cell structure. Although several embodiments of the invention have been shown and described, it will be apparent that other adaptations and modifications can be made without departing from the true spirit and scope of the invention.

I claim:

1. A planar multi-junction electrochemical pump for pumping an electrochemically active fluid, the pump comprising:
   a container defining an inlet chamber in a first portion thereof and an outlet chamber in a second portion thereof;
   a single electrolytic membrane disposed within the container between said chambers and forming therebetween a gastight seal;
   a plurality of pairs of electrodes disposed on either side of and in contact with the electrolytic membrane, the electrodes in the inlet chamber being separated from one another by spaces and the electrodes in the outlet chamber being separated from one another by spaces;
   means for electrically connecting the electrodes; and
   means for applying an electrical voltage to the electrodes to establish a voltage gradient across the membrane to convert the fluid into ions in the inlet chamber, propel the ions through the membrane into the outer chamber, and reconvert the ions into fluid in the outlet chamber whereby the fluid is pumped from the inlet chamber into the outlet chamber.

2. The electrochemical pump of claim 1, and further comprising:
   means for supplying the fluid to the inlet chamber.

3. The electrochemical pump of claim 1, and further comprising:
   means for withdrawing the fluid from the outlet chamber.

4. The electrochemical pump of claim 1, wherein:
   the means for electrically connecting the electrodes includes means for electrically connecting the electrodes in series.

5. The electrochemical pump of claim 1, wherein:
   the means for electrically connecting the electrodes includes means for electrically connecting the electrodes in parallel.

6. The electrochemical pump of claim 1, wherein:
   each of the electrodes includes a thin film of metal deposited directly on the membrane.

7. The electrochemical pump of claim 1, wherein:
   the means for electrically connecting the electrodes includes a plurality of contact pins connecting a plurality of metal traces deposited on the inner face of the container walls.

8. The electrochemical pump of claim 1, wherein:
   the electrochemically active fluid includes a reduction/oxidation couple of hydrogen and hydrogen.

9. A planar multi-junction electrochemical fuel cell comprising:
   a container defining a first chamber in a first portion thereof and a second chamber in a second portion thereof;
   a single electrolytic membrane disposed within the container between said chambers and forming therebetween a gastight seal;
   a plurality of pairs of electrodes disposed on either side of and in contact with the electrolytic membrane, the electrodes in the first chamber being separated from one another by spaces and the electrodes in the second chamber being separated from one another by spaces;
   means for electrically connecting the electrodes;
   means for supplying a fuel gas to the first chamber; and
   means for supplying a gaseous oxidant to the second chamber.

10. The electrochemical fuel cell of claim 9, and further comprising:
    means for withdrawing from the container the fluid by-product of the generation of electricity.

11. The electrochemical fuel cell of claim 10, wherein:
    the means for electrically connecting the electrodes includes means for electrically connecting the electrodes in series.

12. The electrochemical fuel cell of claim 10, wherein:
    the means for electrically connecting the electrodes includes means for electrically connecting the electrodes in parallel.

13. The electrochemical fuel cell of claim 10 wherein:
    each of the electrodes includes a thin film of metal deposited directly on the membrane.

14. The electrochemical fuel cell of claim 10, wherein:
    the fuel gas includes hydrogen.

15. The electrochemical fuel cell of claim 14, wherein:
    the gaseous oxidant includes oxygen.

16. A planar multi-junction electrochemical fuel cell comprising:
    a container;
    an electrolytic membrane disposed within the container, the membrane being fixed within the container so as to form a first and second chamber;
    a plurality of pairs of electrodes disposed on either side of and in contact with the electrolytic membrane;
    means for electrically connecting the electrodes, including a plurality of contact pins connecting a plurality of metal traces deposited on the inner face of the container walls;
    means for supplying a fuel gas to the first chamber;
    means for supplying a gaseous oxidant to the second chamber; and
    means for withdrawing from the container the fluid byproduct of the generation of electricity.

17. A planar multi-junction electrochemical fuel cell comprising:
    a container defining a first chamber in a first portion thereof and a second chamber in a second portion thereof;
    a single electrolytic membrane disposed within the container between said chambers and forming therebetween a gas-tight seal;
    a plurality of first electrodes in the first chamber disposed on the membrane in spaced-apart relationship to one another, and a like number of second electrodes in the second chamber disposed on the membrane in spaced-apart relationship to one another, each first electrode being in generally parallel relationship with a differenet one of the second electrodes but separated therefrom by the membrane to define an electrode pair, each first electrode being separated from the other first electrodes by a distance greater than the thickness of the membrane, and each second electrode being separated from the other second electrodes by a distance greater than the thickness of the membrane;

an electrically conductive path between a first electrode comprised in one of the electrode pairs and a second electrode comprised in a different one of the electrode pairs whereby said electrode pairs are connected in series;

means for supplying a fuel gas to the first chamber; and means for supplying a gaseous oxidant to the second chamber.

18. A fuel cell according to claim 17 and further comprising means for withdrawing fluid from the container.

19. A fuel cell according to claim 17 wherein an electrode comprises a thin electrically-conductive layer on the membrane.

20. A fuel cell according to claim 17 wherein the fuel gas comprises hydrogen.

21. A fuel cell according to claim 17 wherein the gaseous oxidant comprises oxygen.

22. A fuel cell according to claim 17 wherein the means for electrically connecting the electrodes includes a plurality of contact pins connecting a plurality of metal traces deposited on the inner face of the container walls.

23. A planar multi-junction electrochemical pump for pumping an electrochemically active fluid, the pump comprising:

a container defining an inlet chamber in a first portion thereof and an outlet chamber in a second portion thereof;

a single electrolytic membrane disposed within the container between said chambers and forming therebetween a gas-tight seal;

a plurality of first electrodes in the inlet chamber disposed on the membrane in spaced-apart relationship to one another, and a like number of second electrodes in the outlet chamber disposed on the membrane in spaced-apart relationship to one another, each first electrode being in generally parallel relationship with a different one of the second electrodes but separated therefrom by the membrane to define an electrode pair, each first electrode being separated from the other first electrodes by a distance greater than the thickness of the membrane, and each second electrode being separated from the other second electrodes by a distance greater than the thickness of the membrane;

an electically conductive path between a first electrode comprised in one of the electrode pairs and a second electrode comprised in a different one of the electrode pairs whereby said electrode pairs are connected in series; and means for producing a voltage gradient across said series-connected electrode pairs to convert the fluid into ions in the inlet chamber, propel the ions through the membrane into the outlet chamber, and reconvert the ions into fluid in the outlet chamber whereby the fluid is pumped from the inlet chamber into the outlet chamber.

24. A pump according to claim 23 and further comprising means for supplying the fluid to the inlet chamber.

25. A pump according to claim 23 and further comprising means for withdrawing the fluid from the outlet chamber.

26. An electrochemical pump according to claim 23 wherein the electrochemically active fluid comprises hydrogen.

27. An electrochemical pump according to claim 23 wherein the means for electrically connecting the electrodes includes a plurality of contact pins connecting a plurality of metal traces deposited on the inner face of the container walls.

28. A planar multi-junction electrochemical pump for pumping a fluid, the pump comprising:

upper and lower generally annular membrane supports;

an electrolytic membrane fixed between said supports;

an upper segment adjacent the upper membrane support and defining therewith an inlet chamber;

a lower segment adjacent the lower membrane support and defining therewith an outlet chamber separated from the inlet chamber by the membrane;

a plurality of first electodes in the first chamber disposed on the membrane in spaced-apart relationship to one another, and a like number of second electrodes in the second chamber disposed on the membrane in spaced-apart relationship to one another, each first electrode being in generally parallel relationship with a different one of the second electrodes but separated therefrom by the membrane to define an electrode pair, each first electrode being separated from the other first electrodes by a distance greater than the thickness of the membrane, and each second electrode being separated from the other second electrodes by a distance greater than the thickness of the membrane;

an electrically conductive path between a first electrode associated with one of the electrode pairs and a second electrode associated with a different one of the electrode pairs whereby said electrode pairs are connected in series; and means for applying an electrical voltage to the electrodes to establish a voltage gradient across the membrane to convert the fluid into ions in the inlet chamber, propel the ions through the membrane into the outlet chamber, and reconvert the ions into fluid in the outlet chamber whereby the fluid is pumped from the inlet chamber into the outlet chamber.

29. A pump according to claim 28 wherein the means for electrically connecting the electrodes includes a plurality of contact pins connecting a plurality of metal traces, each trace being in contact with a different one of the electrodes.

30. A pump according to claim 28 and further comprising means for supplying the fluid to the inlet chamber.

31. A pump according to claim 28 and further comprising means for withdrawing the fluid from the outlet chamber.

* * * * *